United States Patent Office 2,755,299
Patented July 17, 1956

2,755,299

Ar'-CYANOMETHYL CHALCONES AND THEIR SYNTHESIS

Kurt J. Rorig, Evanston, Ill., assignor, by mesne assignments, to G. D. Searle & Co., Skokie, Ill., a corporation of Delaware No Drawing. Application April 1, 1953, Serial No. 346,251

7 Claims. (Cl. 260—465)

The present invention relates to a new group of organic compounds and specifically to the Ar'-cyanomethyl chalcones of the structural formula

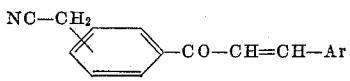

herein Ar is a phenyl or a substituted phenyl radical. Among the radicals which Ar can represent are lower alkyl phenyl, fluorophenyl, chlorophenyl, bromophenyl, iodophenyl, cyanophenyl and aminophenyl radicals.

In my co-pending application, Serial No. 296,480, filed June 30, 1952, now Patent No. 2,713,065, it was shown that the condensation of an aceto-α-tolunitrile with a benzaldehyde proceeds under the alkaline conditions used in the syntheses of that application as follows:

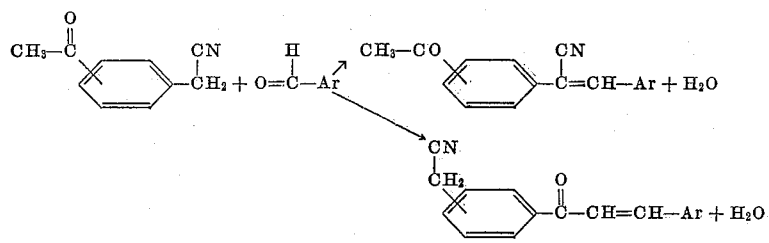

Since the aceto-α-tolunitrile molecule contains an active methylene as well as an active methyl group, attack of the aldehyde group can occur on both of these places when the reaction is carried out under alkaline condition. I showed that the methylene group between the nitrile radical and the benzene ring is more active under alkaline conditions than the methyl group adjacent to the carbonyl and that, therefore, the reaction mixture contains principally the α-acetophenylcinnamonitriles and only a small amount of the Ar'-cyanomethylchalcones. It has now been found that under acidic conditions the reaction proceeds almost exclusively in the other direction so that the Ar'-cyanomethylchalcones are obtained in good yields.

The chalcones of my invention are valuable medicinal agents particularly in the treatment of cardiovascular diseases and endocrine dysfunction. They antagonize hypertension and have a corrective effect on gonadal imbalance. They also are useful as intermediates in organic synthesis.

The examples below illustrate in detail some of the compounds which comprise this invention and methods for their production. However this invention is not to be construed as limited thereby in spirit or in scope. In each of these examples temperatures are given uncorrected in degrees centigrade (° C.), and relative amounts of materials in parts by weight.

EXAMPLE 1

4'-cyanomethylchalcone

A solution of 159 parts of 4-acetotolunitrile and 106 parts of benzaldehyde in 1500 parts of absolute methanol is treated with a slow stream of 30 parts of anhydrous hydrogen chloride. After heating to 60° C. for an hour the reaction mixture is permitted to stand at room temperature for 30 days. The precipitate is collected on a filter. Recrystallized from ethanol, the product melts at about 107–108° C. The infrared absorption spectrum shows major maxima at about 6.04 and 6.24 microns and a weak maximum at about 4.40 microns. The 4'-cyanomethylchalcone thus obtained has the structural formula

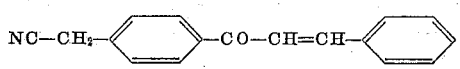

EXAMPLE 2

4-chloro-4'-cyanomethylchalcone

Into a solution of 159 parts of 4-acetotolunitrile and 140 parts of 4-chlorobenzaldehyde in 1500 parts of methanol are bubbled 30 parts of anhydrous hydrogen chloride. The reaction mixture is heated at 60° C. for an hour and then permitted to stand at room temperature for a month, after which the precipitate is collected on a filter and recrystallized from ethanol. The 4-chloro-4'-cyanomethylchalcone thus obtained melts at about 169–171° C. and shows infrared maxima at about 4.4, 6.05, 6.25, 9.1 and 9.6 microns. The compound has the structural formula

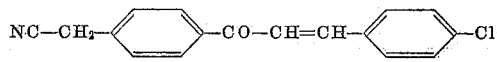

EXAMPLE 3

3-bromo-4'-cyanomethylchalcone

A solution of 159 parts of 4-acetotolunitrile and 185 parts of 3-bromobenzaldehyde in 1800 parts of absolute methanol is treated with a slow stream of 30 parts of gaseous hydrogen chloride and then heated at 60° C. for an hour. It is permitted to stand at room temperature for three weeks after which time the precipitated 3-bromo-4'-cyanomethylchalcone is collected. The compound shows major infrared maxima at about 6.03, 6.24, 9.6 and 9.74 microns and a minor maximum at 4.4 microns. It has the structural formula

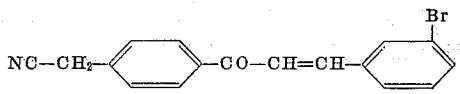

EXAMPLE 4

4-isopropyl-3'-cyanomethylchalcone

A mixture of 159 parts of 3-acetotolunitrile and 148 parts of cumaldehyde in 1600 parts of methanol is treated with a slow stream of 30 parts of anhydrous hydrogen chloride and then heated at 60° C. for an hour. Upon standing at room temperature for several weeks the 4-isopropyl-3'-cyanomethylchalcone precipitates. This compound shows a minor infrared maximum at about 4.4 and major infrared maxima at 6.04 and 6.25 microns. It has the structural formula

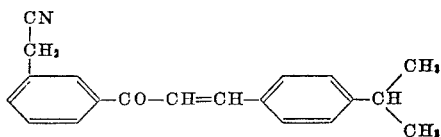

EXAMPLE 5

*4-hydroxy-4'-cyanomethylchalcone*

A solution of 159 parts of 4-acetotolunitrile and 124 parts of 4-hydroxybenzaldehyde in 1600 parts of methanol is treated with 30 parts of gaseous hydrogen chloride and then heated at 55° C. After storage at 20° C. for three weeks the 4-hydroxy-4'-cyanomethylchalcone has precipitated. The infrared absorption spectrum shows a minor maximum at 4.4 and major maxima at 2.78, 6.05 and 6.25 microns. The compound has the structural formula

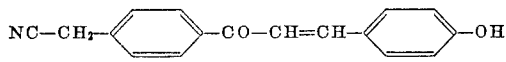

EXAMPLE 6

*3-methoxy-4'-cyanomethylchalcone*

A solution of 320 parts of 4-acetotolunitrile and 272 parts of 3-anisaldehyde in 3000 parts of absolute methanol is treated with 60 parts of anhydrous hydrogen chloride and then heated at 60° C. for an hour. After standing at room temperature for 3 weeks the crystalline precipitate is collected on a filter and recrystallized from ethanol. The 3-methoxy-4'-cyanomethylchalcone thus obtained melts at about 107–108.5° C. It has major infrared maxima at about 6.05, 6.24 and 9.60 microns and a minor maximum at 4.4 microns. The compound has the structural formula

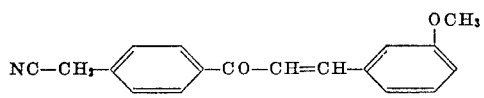

EXAMPLE 7

*4-methoxy-4'-cyanomethylchalcone*

Into a solution of 477 parts of 4-acetotolunitrile and 408 parts of 4-anisaldehyde in 4500 parts of absolute methanol 90 parts of anhydrous hydrogen chloride are bubbled and the solution is heated at 60° C. for an hour. After standing at room temperature for 30 days the 4-methoxy-4'-cyanomethylchalcone is collected on a filter and recrystallized from ethanol. The crystals melt at about 122.5–123.5° C. The infrared absorption spectrum shows major maxima at 6.04, 6.24 and 9.59 microns and a weak maximum at 4.40 microns. The compound has the structural formula

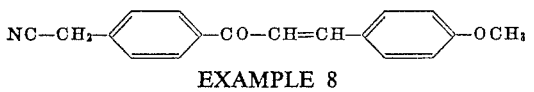

EXAMPLE 8

*3-cyano-3'-cyanomethylchalcone*

A mixture of 159 parts of 3-acetotolunitrile and 133 parts of 3-cyanobenzaldehyde in 1600 parts of methanol is treated with a slow stream of 30 parts of hydrogen chloride and then heated at 65° C. for 90 minutes. After standing at room temperature for 10 days the 3-cyano-3'-cyanomethylchalcone is collected on a filter. It shows infrared absorption maxima at 4.4, 6.04 and 6.25 microns. The compound has the structural formula

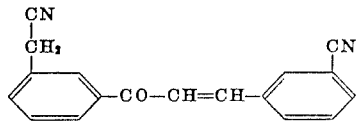

EXAMPLE 9

*4-methoxy-4'-cyanochalcone*

A mixture of 145 parts of 4-cyanoacetophenone and 136 parts of 4-methoxybenzaldehyde in 1600 parts of methanol is heated to 50° C., treated with 10 parts of sodium methoxide and heated at 50° C. for 5 minutes. On scratching and cooling a precipitate forms which is collected on a filter and washed with ethanol. The resulting 4-methoxy-4'-cyanochalcone melts at about 146–147.5° C. The infrared absorption spectrum shows a maximum at about 4.5 microns rather than at 4.4 microns as in the preceding examples.

I claim:

1. The compounds of the structural formula

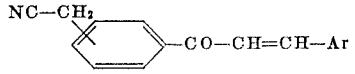

wherein Ar is a member of the class consisting of phenyl, hydroxyphenyl, methoxyphenyl, lower alkylphenyl, halophenyl and cyanophenyl radicals.

2. The compounds of the structural formula

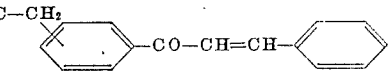

3. The compounds of the structural formula

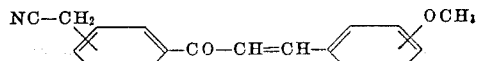

4. The compounds of the structural formula

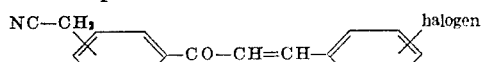

5. The compounds of the structural formula

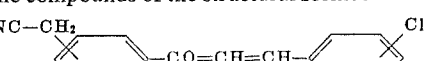

6. The compounds of the structural formula

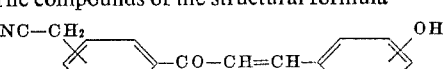

7. The compounds of the structural formula

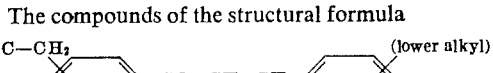

References Cited in the file of this patent

UNITED STATES PATENTS

| | | |
|---|---|---|
| 2,496,697 | Chapin | Feb. 7, 1950 |
| 2,647,148 | Martin et al. | July 28, 1953 |